US008832857B2

(12) United States Patent
Court et al.

(10) Patent No.: US 8,832,857 B2
(45) Date of Patent: Sep. 9, 2014

(54) UNSECURED ASSET DETECTION VIA CORRELATED AUTHENTICATION ANOMALIES

(75) Inventors: John William Court, Carrara (AU); Simon Gilbert Canning, Upper Coomera (AU); Simon Winston Gee, Varsity Lakes (AU); Shane Bradley Weeden, Paradise Point (AU)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 13/547,722

(22) Filed: Jul. 12, 2012

(65) Prior Publication Data
US 2014/0020077 A1    Jan. 16, 2014

(51) Int. Cl.
G06F 7/04    (2006.01)
(52) U.S. Cl.
USPC .............. 726/28; 726/1; 726/2; 726/3; 726/4; 726/5; 726/26; 726/27
(58) Field of Classification Search
USPC ............................................. 726/1–5, 26–28
See application file for complete search history.

(56) References Cited

U.S. PATENT DOCUMENTS

| | | | |
|---|---|---|---|
| 7,571,478 B2 | 8/2009 | Munson et al. | |
| 8,332,627 B1 * | 12/2012 | Matthews et al. | 713/155 |
| 8,572,708 B2 * | 10/2013 | Barriga et al. | 726/8 |
| 2006/0212593 A1 * | 9/2006 | Patrick et al. | 709/230 |
| 2007/0283424 A1 * | 12/2007 | Kinser et al. | 726/5 |
| 2008/0046984 A1 * | 2/2008 | Bohmer et al. | 726/5 |
| 2011/0276493 A1 * | 11/2011 | Graham et al. | 705/53 |
| 2012/0110318 A1 * | 5/2012 | Stone | 713/150 |
| 2012/0260322 A1 * | 10/2012 | Logan et al. | 726/6 |
| 2013/0117832 A1 * | 5/2013 | Gandhi et al. | 726/7 |
| 2013/0212665 A1 * | 8/2013 | Goyal et al. | 726/8 |

OTHER PUBLICATIONS

Eap et al., Enabling User Control with Personal Identity Management, 2007 IEEE International Conference on Services Computing, pp. 1-8.*
Zwattendorfer et al., Secure Cloud Authentication Using EIDS, Proceedings of IEEE CCIS2012, pp. 397-401.*

* cited by examiner

Primary Examiner — Christopher Brown
Assistant Examiner — Roderick Tolentino
(74) Attorney, Agent, or Firm — Jeffrey S. LaBaw; David H. Judson

(57) ABSTRACT

A method, apparatus and computer program product for detecting that a computing device may not be secure based on inconsistent identity associations identified during Federated Single Sign-On (F-SSO). A detection proxy detects when a user with a particular session is accessing an identity provider (IdP) that is associated with an account that is not the current user's account. When a user performs a login to an F-SSO-enabled IdP, the proxy performs an F-SSO, and the results are compared with known aliases for that particular federation partner. If an anomaly is detected (e.g., the in-line device sees that a user logs into a web site as someone else), a workflow is initiated to perform a given action, such as blocking access, issuing an alert, or the like.

20 Claims, 5 Drawing Sheets

UNSECURED ASSET DETECTION VIA CORRELATED AUTHENTICATION ANOMALIES

BACKGROUND OF THE INVENTION

1. Technical Field

This disclosure relates generally to corporate data security and in particular to detecting that a computing device may not be secure based on inconsistent identity associations with identity providers associated with an enterprise.

2. Background of the Related Art

User authentication is one function that service providers offer to ensure that users accessing resources (e.g., applications, web content, etc.) are authorized to do so. To ensure that a user is not an imposter, service providers (e.g., web servers) generally ask for a user's username and password to prove identity before authorizing access to resources. Single sign-on (SSO) is an access control mechanism which enables a user to authenticate once (e.g., provide a username and password) and gain access to software resources across multiple systems. Typically, an SSO system enables user access to resources within an enterprise or an organization. Federated Single Sign-on (F-SSO) extends the concept of single sign-on across multiple enterprises, thus establishing partnerships between different organizations and enterprises. F-SSO systems typically include application level protocols that allow one enterprise (e.g., an identity provider) to supply a user's identity and other attributes to another enterprise (e.g., a service provider). In other words, an F-SSO system helps transport the user's credentials from the identity provider to the service provider using any suitable protocol. Typically, current F-SSO techniques use HTTP as the transport protocol.

In an enterprise environment, unsecured user credentials and unsecured personal computing devices represent a significant threat to corporate data security. Often, sensitive information is accessed from one individual's computing device using another's credentials either with or without consent. The former situation usually represents a violation of corporate security policy (i.e. sharing of credentials), while the latter scenario represents the more serious possibility of credential theft. Some organizations, mainly financial ones, have attempted to solve the credential issue using smart card tokens in a two factor authentication approach (i.e., token+password) and very short inactivity timers. This approach is expensive and not practical for everyday commodity workstation security or "bring you own device" situations, which are becoming more prevalent. These environments, which represent the vast majority of organizations, tend to rely solely on password protection and relatively long inactivity time-outs.

In addition to credentials, unsecured personal computing devices left unattended present the opportunity for unauthorized information access and transferal. A common approach to solving this issue is to perform deep content inspection on all data leaving the corporate network in an attempt to detect sensitive information. An obvious flaw with this approach is that any encrypted tunnel connection can defeat such inspection unless the corporation also has implemented a man-in-the-middle approach at their network boundaries. Other prior art solutions include monitoring employee behavior, building behavior models or scores, and then detecting deviations from those expected behaviors to assess potential security issues. These techniques are complex and expensive to implement reliably.

BRIEF SUMMARY

This disclosure describes an approach for detecting that a computing device may not be secure based on inconsistent identity associations with external and internal identity providers. Once detected, one or more actions may be taken, e.g., quarantine the device, issue an alert, or allow the discrepancy, for example, based on one or more levels of identity inconsistency.

Preferably, federated single sign-on (F-SSO) techniques are leveraged to detect anomalies in identity within a user's browser session. To this end, an intermediary in-line device in a network is used to detect when a user with a particular session is accessing an external identity provider (IdP) that is associated with an account that is not the current user's account. In one embodiment, the device is configured as an HTTP outbound proxy device located at or in association with an enterprise firewall and, as such, it can examine requests initiated from a user client (e.g., a browser) during a user session. In operation, the in-line device monitors the external F-SSO requests a particular user performs. When a user performs a login to an F-SSO-enabled IdP, the in-line device performs an F-SSO, and the results are compared with known aliases for that particular federation partner. If an anomaly is detected (e.g., the in-line device sees that a user logs into a web site as someone else), a workflow is initiated to perform a given action, such as blocking access, issuing an alert, or the like. An anomaly is detected in one or more ways, such as inspecting currently-known mappings for a particular user's federated identities, or inspecting results of user attributes returned in the F-SSO against known data in other attribute data stores.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
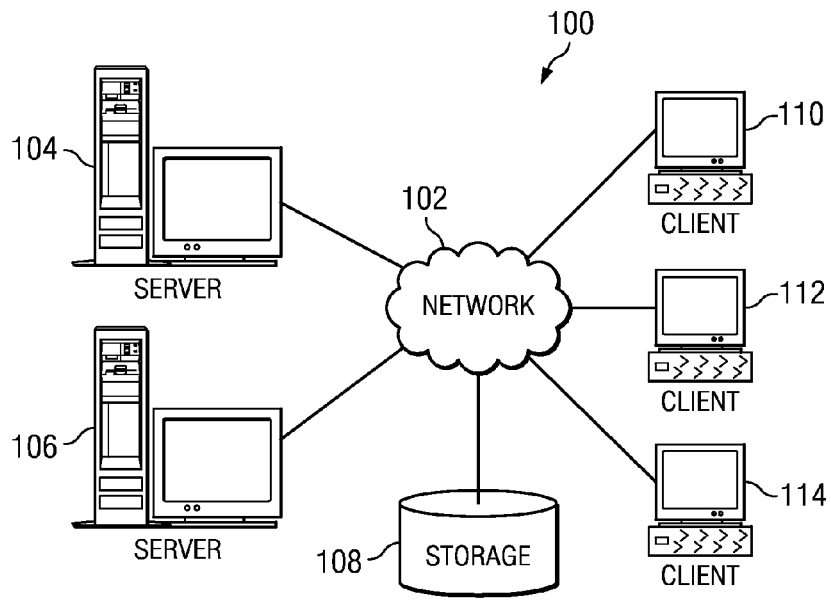
FIG. 1 depicts an exemplary block diagram of a distributed data processing environment in which exemplary aspects of the illustrative embodiments may be implemented.
Figure 2:
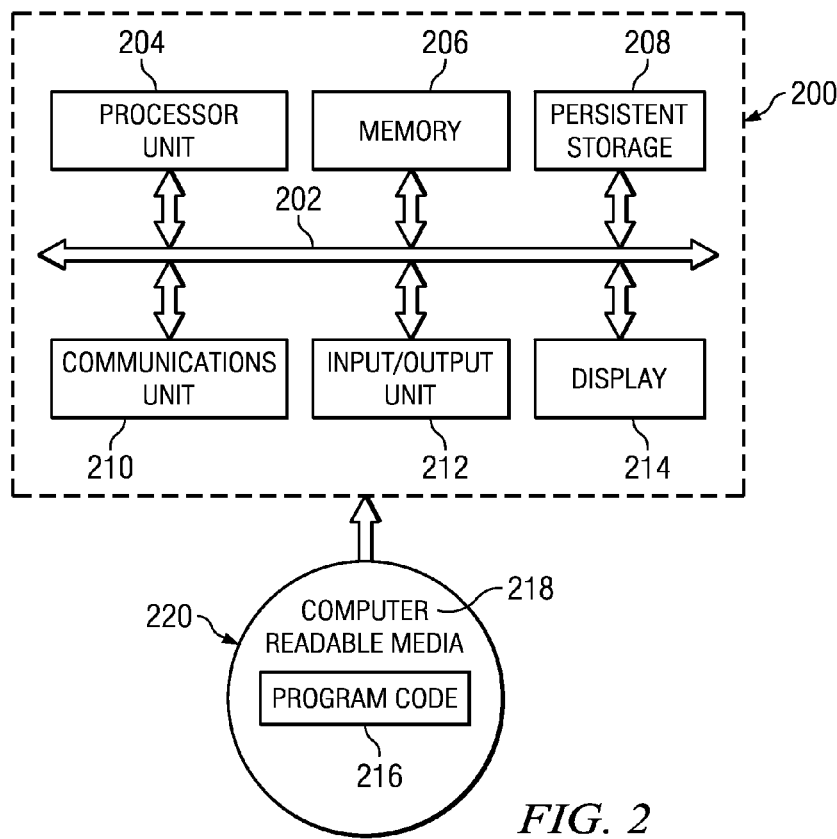
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, as used herein an "assertion" provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service. As is known in the art, a Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May, 31, 2002, as follows.

The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Figure 3:
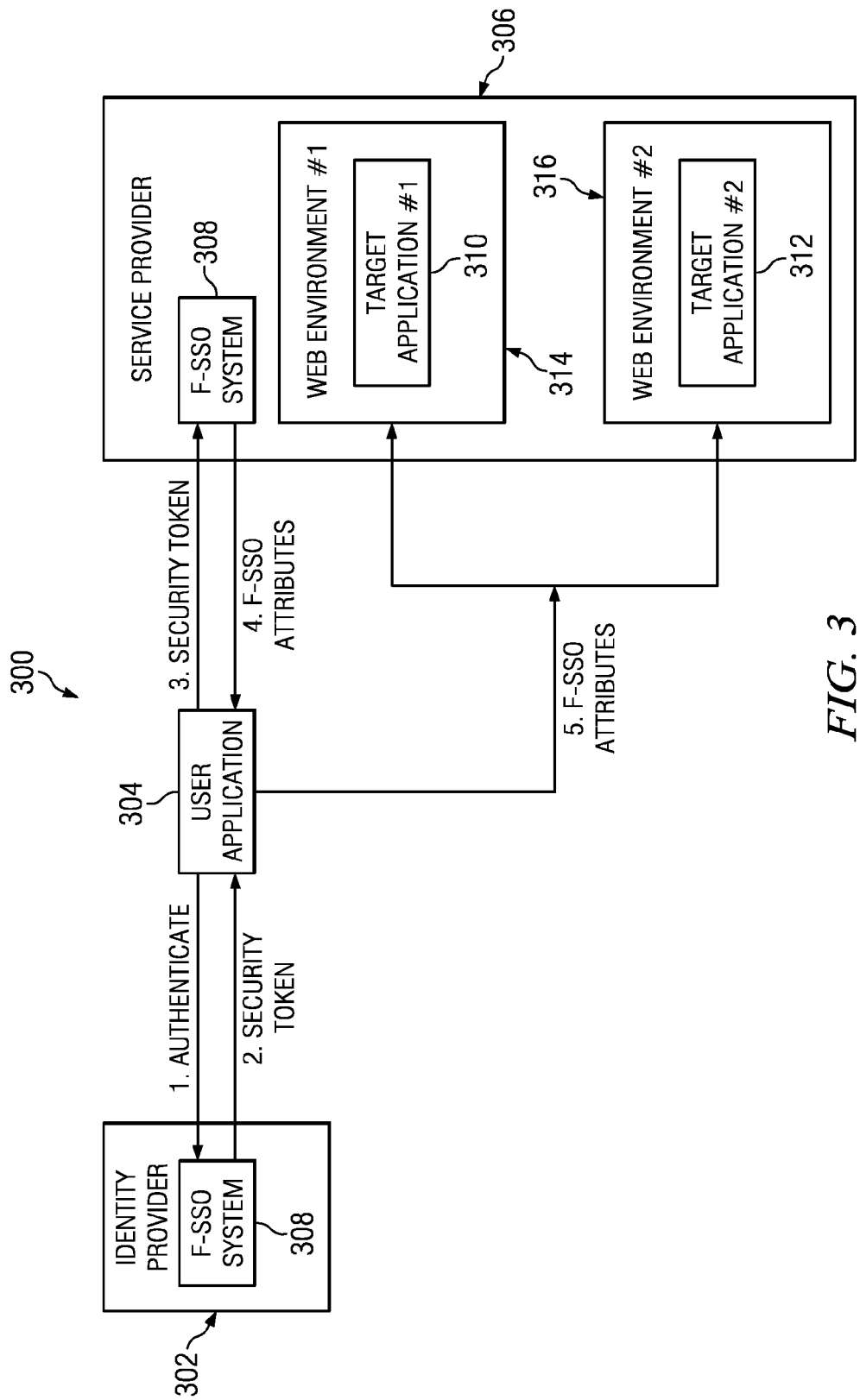
FIG. 3 illustrates a known federated single sign-on (F-SSO) operation.

Single sign-on (SSO) is an access control mechanism which enables a user to authenticate once (e.g., by providing a user name and password) and gain access to software resources across multiple systems. Typically, an SSO system enables user access to resources within an enterprise or an organization. Federated single sign-on (F-SSO) extends the concept of single sign-on across multiple enterprises, thus establishing partnerships among different organizations and enterprises. F-SSO systems typically include protocols, such as SAML, that allow one enterprise (e.g., an identity provider) to supply a user's identity and other attributes to another enterprise (e.g., a service provider). In other words, an F-SSO system helps transport the user's credentials from the identity provider to the service provider in a trusted manner using a suitable protocol, typically HTTP. FIG. 3 is a block diagram illustrating the typical flow of operations in a known federated single sign-on (F-SSO) process. As shown in FIG. 3, the F-SSO process 300 involves communications between an identity provider 302, a user application 304, and a service provider 306. The identity provider 302 and the service provider 304 include an F-SSO system 308, which includes logic to authenticate a user, establish the user's credentials, and generate an encrypted security token (e.g., cookie) including user information. Additionally, the service provider 306 can also include one or more target applications 310 and 312. The target applications can reside within the same web environment or be a part of different web environments 314 and 316 (e.g., Apache, WebSphere® etc.) within the same service provider 306. The user application 304 can include logic (e.g., a web browser) to present content (e.g., web pages) to the user.

In one embodiment, the user application 304 first authenticates to the identity provider 302 (e.g., providing a username and password) as indicated by step 1. In step 2, the identity provider's F-SSO system 308 returns a security token to the user. This security token may be time-sensitive (e.g., can include a time stamp) and cryptographically signed. The security token can include the user's identity (e.g., username) and other attributes (e.g., user identification number) that the identity provider 302 wishes to provide to the service provider 306. The user application 304 can present the security token to the service provider's F-SSO system using any suitable technique (e.g., HTTP request) and message structure (e.g., using HTTP query strings, HTTP POST data, etc.) defined by the F-SSO protocol (refer to step 3). In step 4, the service provider's F-SSO system 308 validates the cryptographic signature of the security token to confirm the token's authenticity of origin and that the contents of the security token are trustworthy. The service provider's F-SSO system can also extract the user's identity and related attributes from the security token and generate an F-SSO attributes cookie including the user's identity and attributes.

After achieving single sign-on (i.e., conveying user attributes from the identity provider's F-SSO system to the service provider's F-SSO system), if the user wants to access a target application (e.g., 310) hosted by the service provider 306, the user application 304 may pass an F-SSO attributes cookie obtained from the service provider's F-SSO system 308 to the target application (as in step 5). In the alternative, attributes may be stored at a proxy and passed as a user's request passes through the proxy so that cookies are not required. In this example embodiment, the transfer of user attributes (e.g., in an F-SSO cookie) is done in a trustworthy and secure manner and can be performed on the basis of F-SSO prescribed protocols (typically HTTP). If the data contained within an F-SSO attributes cookie is accepted and understood by the target application (e.g., if the target application can decrypt and retrieve the cookie's contents), the target application (e.g., e10) validates it and creates a session for the user. In some embodiments, the target applications (e.g., 310) understand the F-SSO attributes cookie, or they can be part of the F-SSO process (i.e., the target application may not include an F-SSO system).

As shown, each target application can be located in a different web environment, with different authentication mechanisms and different requirements. Without limitation, a target application may be located within the enterprise, or it may be located within a cloud-based operating environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. The cloud computing infrastructure typically comprises a set of functional abstraction layers including hardware/software layer, a virtualization layer, a management layer, and a workload layer. The virtualization layer provides an abstraction layer from which the following examples of virtual entities may be provided: virtual servers; virtual storage; virtual networks, including virtual private networks; virtual applications and operating systems; and virtual clients. The management layer provides dynamic procurement of computing resources and other resources that are utilized to perform tasks within the cloud computing environment. The workloads layer provides the functionality for which the cloud computing environment may be utilized. Typically, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli® Federated Identity Manager (TFIM) that is available from IBM® Corporation, of Armonk, N.Y. In appropriate circumstances TFIM may be used to provide F-SSO to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute the target application that is being made available for access via the cloud. One or more databases are used to store directory, log, and other working data. All of these components (included the front end identity manager) are located "within" the cloud, but this is not a requirement.

Unsecured Asset Detection via Correlated Authentication Anomalies

Figure 4:
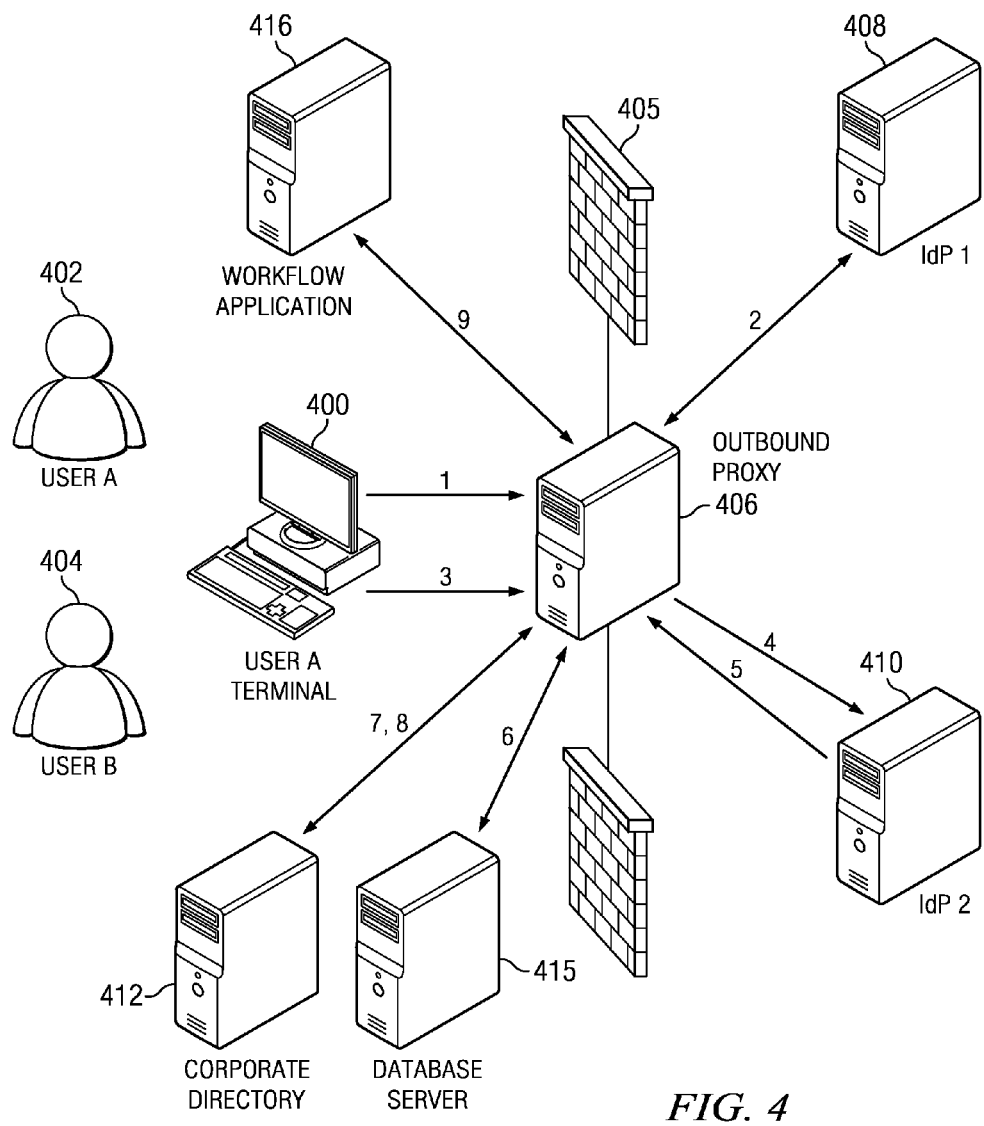
FIG. 4 depicts a representative enterprise environment in which the technique of this disclosure is implemented.

FIG. 4 illustrates a typical enterprise environment in which the technique of this disclosure is implemented.

The enterprise comprises a user terminal 400 accessible by user A 402 and user B 404. A proxy 406 facilitates the detection scheme, as will be seen. It is sometimes referred to herein as an HTTP outbound proxy. HTTP outbound proxies are used in environments where users are connected to a network and can access certain resources but are required to authenticate to have access to additional resources on the network (such as the Internet). One such example is in public wireless network hot spots. Users can access the wireless network but are required to authenticate to access the Internet (via a captive portal). Another example is in a corporate network where users may be able to access the intranet but must authenticate to an in-line device (e.g., a proxy server) before being allowed to access the Internet. Some such devices allow access to certain web sites but require authentication to others.

In this illustrative (but non-limiting) embodiment, the HTTP outbound proxy is located in the corporate (enterprise) network at or adjacent an enterprise firewall (or DMZ) 405. The proxy 406 is in-line between the user terminal 400 and one or more external identity providers, such as a first identity provider (IdP) 408, and a second IdP 410. A corporate directory (e.g., LDAP, Active Directory, or the like) is supported on corporate directory 412, and a database server 414 is used to store enterprise data. A workflow application 416 implements an anomaly detection workflow based on detection of a security event as described below. The particular workflow implemented may be configured by a security policy stored in the corporate directory (or other policy management system).

In a typical use case scenario, at step (1) user A 402 accesses a network segment that requires authentication to the outbound proxy 406 via his or her computing device, such as terminal 400. At step (2), the outbound proxy 406 interacts with IdP 408, discovers the user identity and creates a session for that identity. The use of IdP 408 for this purpose is merely representative. At step (3), user B maliciously accesses an IdP (e.g., IdP 410) where user A has an account but to which he or she has not authenticated for the current session, and authenticates to that IdP as user B. According to this disclosure, at step (4) the proxy 406 invokes an F-SSO flow (e.g., an OpenID checkid_immediate flow, a SAML 2.0 HTTP POST binding, an OAuth 2.0 flow where the protected resource is the user's identity information) at the IdP 410 on behalf of the proxy for user B. At step (5), the results of the F-SSO (namely, user B's identity) are sent back to the proxy 406 (acting as a service provider SP). At step (6), the proxy 406 looks-up user A's known IdP relationships, which are typically stored in the database server 414. The proxy recognizes that the identities (received at respective steps (5) and (6)) do not match; thus, at step (7), the proxy inspects attributes (which were returned as part of the F-SSO) against known attribute data stored, for example, in the corporate directory 412. The routine then continues at step (8) to compare the attributes. If the attributes match, the request can continue (and, optionally, the IdP 410 is added as a known partner for this user). If, however, the attributes do not match, at step (9), an anomaly detection workflow is executed by workflow application 416. Based on the configured security policy, the workflow blocks the access, issues an alert, logs an event, quarantines the terminal, or takes some other action.

Figure 5:
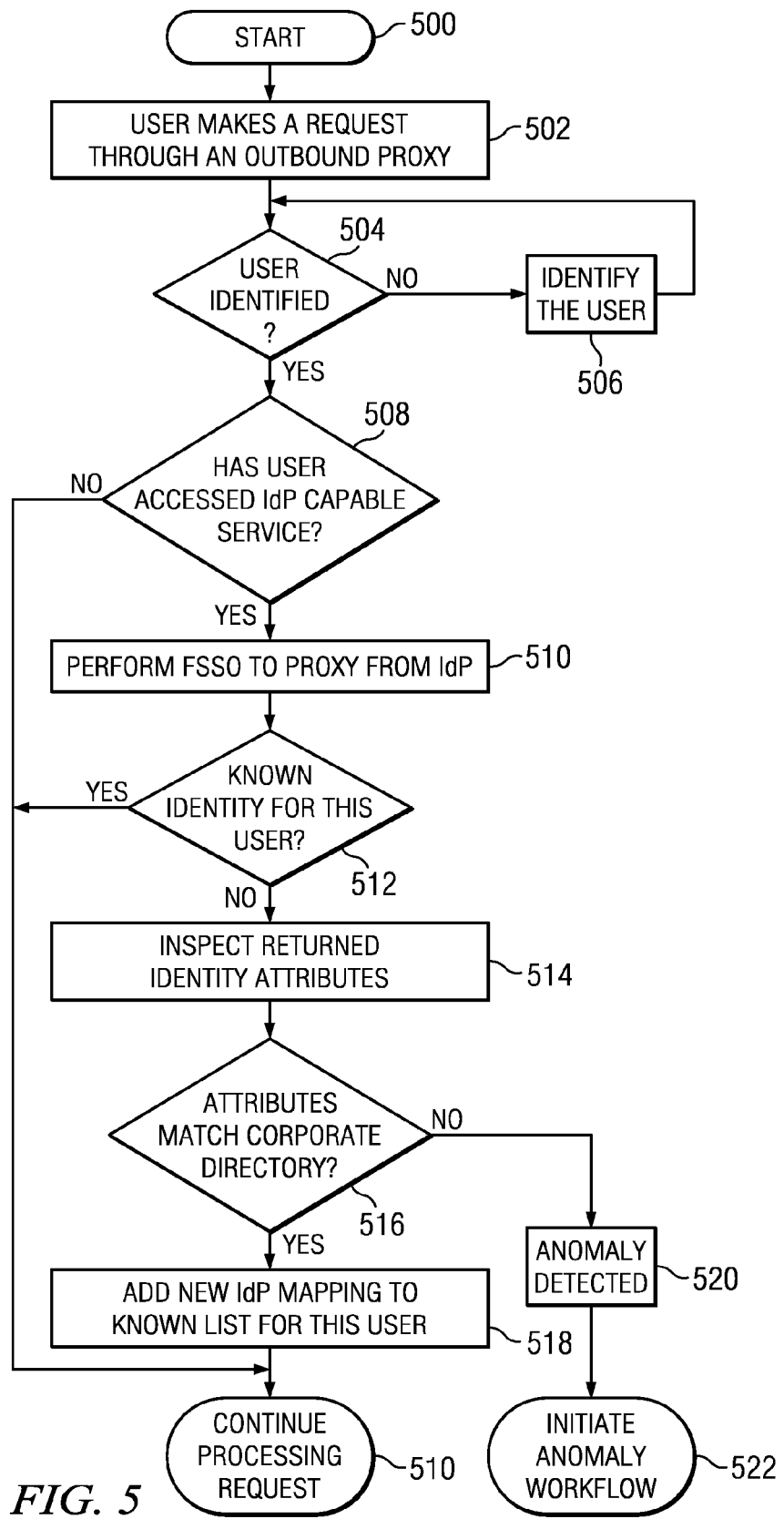
FIG. 5 illustrates a process flow of a representative embodiment.

FIG. 5 illustrates a process flow of the method for unsecured asset detection via correlated authentication anomalies of this disclosure. This process is implemented in the in-line detection proxy, such as proxy 406 in FIG. 4. Generalizing, the detector is a machine, device, program, process, execution thread, or the like, that performs the following operations. The method begins at step 500. At step 502, a user makes a request through the outbound proxy. At step 504, a test is performed to determine if the user is identified. If not, the routine branches to step 506 to identify the user, and control returns. If the outcome of the test at step 504 is positive, the routine continues at step 508 to test whether the user request is directed to an IdP-capable service. If not, the routine continues at step 510 and continues to process the request. The process then ends. If, however, the outcome of the test at step 508 indicates that the user request is directed to an IdP-capable service, the routine branches to step 510. At step 510, the proxy initiates F-SSO to the IdP. The routine then continues at step 512 to test whether information returned from the F-SSO indicates that this is a known identity for this particular user. If the outcome of the test at step 512 is positive, the routine branches to step 510 and terminates. If, however, the outcome of the test at step 512 is negative, the routine continues at step 514 by the proxy inspecting the identity attributes returned as a result of the F-SSO in step 510. A test is then performed at step 516 to determine whether the attributes returned as a result of the F-SSO match those in a directory. If the outcome of the test at step 516 is positive, the routine continues at step 518 by adding the IdP mapping to a known list for this user; the routine then terminates at step 510. If, however, the outcome of the test at step 516 is negative, the routine continues at step 520, as an anomaly has been detected. The routine then branches to step 522 to initiate the anomaly workflow. This completes the process.

Without limitation, there may be various techniques implemented to identity an anomaly. In one embodiment, the proxy inspects the currently-known mappings for the user's federated identities (e.g., is jsmith@au.ibm.com linked to johnsmith@gmail.com for the Gmail IdP). In another embodiment, the mechanism inspects results of user attributes returned in the F-SSO (such as, without limitation, name, address, e-mail, or the like) to determine if they match against data in the corporate directory or other known attribute data stores. Both approaches may be used concurrently, as has been described.

The subject technique may be implemented using known F-SSO protocols that assert a user identity at a service provider. These known F-SSO protocols include, for example, OpenID, SAML (Post/Artifact), or an OAuth-protected resource request.

As an alternative embodiment, an identity manager (e.g., IBM Tivoli Federated Identity Manager) may be used as the service provider (SP) part of the F-SSO flow, acting on behalf of the in-line device.

Figure 6:
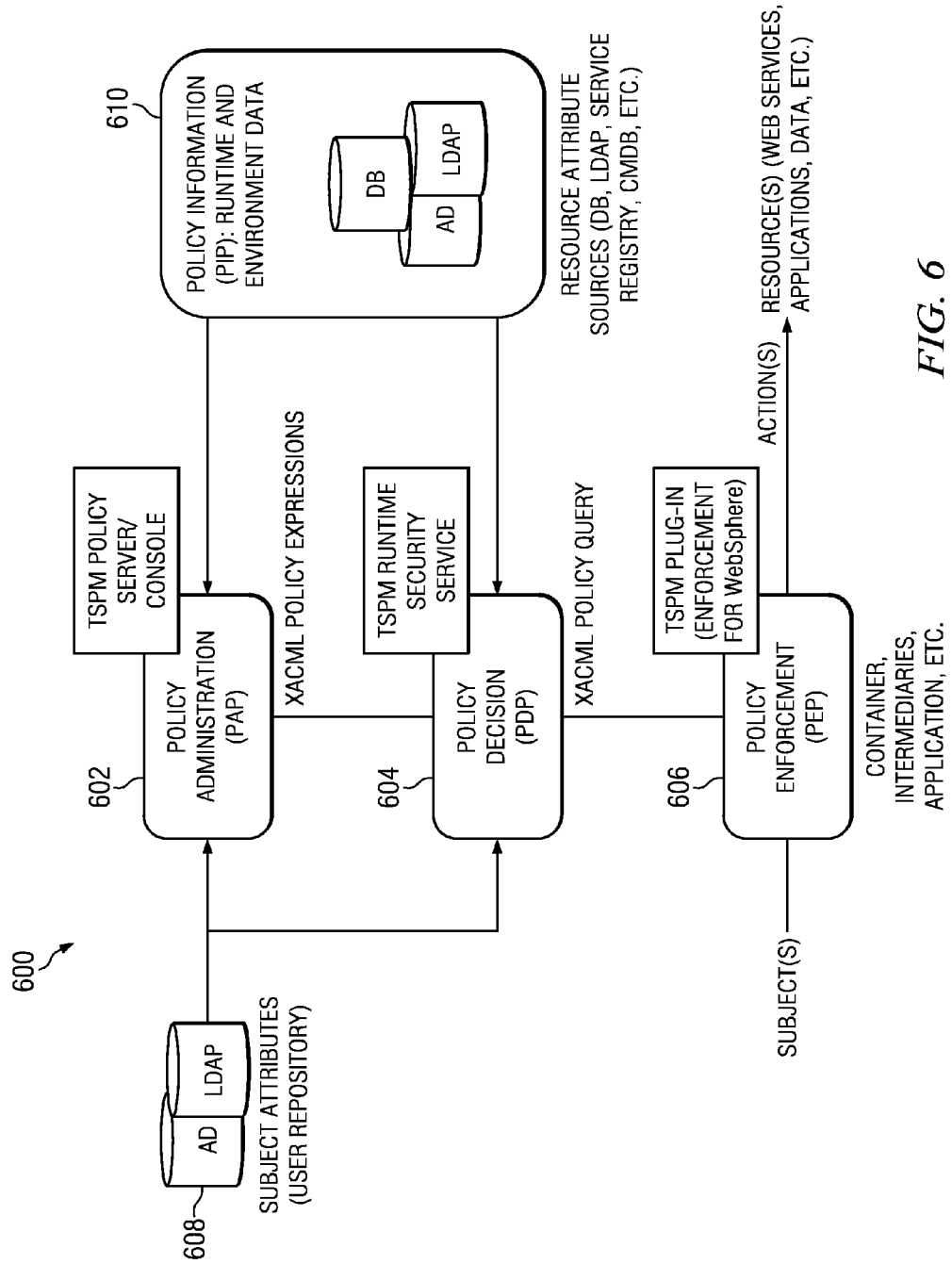
FIG. 6 illustrates a policy management system in which the anomaly workflow may be implemented.

FIG. 6 illustrates a policy management system in which the anomaly workflow of this disclosure may be implemented. The system 600 may be implemented across one or more machines operating in a computing environment, such as shown in FIG. 1. Typically, the system comprises a policy administration point (PAP) 602, a policy decision point (PDP) 604, and a policy enforcement point (PEP) 606. Generally, the policy administration point 602 is used to define a payment device transaction policy, which may be specified as a set of XACML policy expressions. This policy uses subject attributes provided from a user repository 608, as well runtime and environment data received from policy information point (PIP) 610. The policy decision point (PDP) 604 receives similar information and responds to an XACML policy query received from the policy enforcement point (PEP) 606 to enforce the policy on a subject and with respect to a particular action initiated by the subject. PEP 606 implements the desired anomaly workflow. In one commercial implementation of this approach, the PAP 602 is implemented by IBM Tivoli Security Policy Manager (TSPM) policy service/console, the PDP 604 is implemented in the TSPM runtime security service, and the PEP is implemented as a TSPM plug-in to WebSphere Application Server.

In an alternative embodiment, instead of using a policy management system such as shown in FIG. 6, a simple workflow engine that executes an anomaly workflow after a trigger may be used.

The disclosed technique provides several advantages. It solves the problem of protecting against misuse of unsecured user credentials and/or unsecured computing devices. The technique allows non-invasive detection of potential risk and does not rely on computing devices being under direct software deployment control of the organization. The technique is further advantageous as it leverages F-SSO techniques to detect anomalies. By integrating with existing policy management systems, an anomaly detection workflow may be easily and effectively implemented.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

As the above examples illustrate, one or more of the F-SSO functions may be hosted within or external to the cloud.

Still more generally, the subject matter described herein can take the form of an entirely hardware embodiment, an entirely software embodiment or an embodiment containing both hardware and software elements. In a preferred embodiment, the anomaly detection function is implemented in software, which includes but is not limited to firmware, resident software, microcode, and the like. The data retrieved by the detection device can be configured into a data structure (e.g., an array, a linked list, etc.) and stored in a data store, such as computer memory. Furthermore, as noted above, the enhanced F-SSO functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the proxy and F-SSO components are implemented in a special purpose computer, preferably in software executed by one or more processors. The associated configuration (security levels, status, timers) is stored in an associated data store. The software also is maintained in one or more data stores or memories associated with the one or more processors, and the software may be implemented as one or more computer programs.

The proxy and F-SSO functions may be implemented as an adjunct or extension to an existing access manager or policy management solution.

As noted above, although SAML has been described as the preferred assertion format, this is not a limitation, as other techniques (e.g., attribute certificates) for providing the authentication data may be used.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

While the disclosed technique has been described in the context of an HTTP outbound proxy, this is not a limitation. The functionality may be implemented in any intermediary in-line device that can implement the F-SSO protocol.

The invention claimed is:

1. A method of detecting that a computing device associated with a first user is unsecured, comprising:
    during a session established with the first user, receiving a request from the computing device and made by a second user, the request being a request to access an identity provider where the first user has an account but has not yet authenticated for the session;
    following authentication of the second user at the identity provider, automatically invoking a federated single sign-on (F-SSO) to the identity provider on behalf of the second user;
    receiving results from the invoked F-SSO;
    analyzing information returned in the results to detect an authentication anomaly that indicates the computing device is being used by the second user during the session established with the first user and thus is unsecured; and
    upon detecting an authentication anomaly, initiating an anomaly workflow;
    wherein at least one of the receiving, invoking, analyzing and initiating steps are carried out in software executing in a hardware element.

2. The method as described in claim 1 wherein the analyzing step comprises:
    retrieving data associated with one or more known identity provider relationships for the first user associated with the session; and
    comparing the retrieved data with information about the second user returned in the results from the invoked F-SSO.

3. The method as described in claim 2 wherein the analyzing step further comprises:
    retrieving one or more identity attributes for the first user associated with the session; and
    comparing the retrieved one or more identity attributes with information returned in the results from the invoked F-SSO.

4. The method as described in claim 1 wherein the anomaly workflow performs an action.

5. The method as described in claim 4 wherein the action is one of: issuing a notification, sending an alert, blocking the request, quarantining the computing device, and allowing the request to continue to proceed despite the anomaly.

6. The method as described in claim 1 wherein the F-SSO request is an external F-SSO request.

7. The method as described in claim 1 wherein the session is a user session initiated from a client browser.

8. Apparatus to detect that a computing device associated with a first user is unsecured, comprising:
    a processor;
    computer memory holding computer program instructions that when executed by the processor perform a method comprising:
        during a session established with the first user, receiving a request from the computing device and made by a second user, the request being a request to access an identity provider where the first user has an account but has not yet authenticated for the session;
        following authentication of the second user at the identity provider, automatically invoking a federated single sign-on (F-SSO) to the identity provider on behalf of the second user;
        receiving results from the invoked F-SSO;
        analyzing information returned in the results to detect an authentication anomaly that indicates the computing device being used by the second user during the session established with the first user and thus is unsecured; and
        upon detecting an authentication anomaly, initiating an anomaly workflow.

9. The apparatus as described in claim 8 wherein the analyzing step comprises:
    retrieving data associated with one or more known identity provider relationships for the first user associated with the session; and
    comparing the retrieved data with information about the second user returned in the results from the invoked F-SSO.

10. The apparatus as described in claim 9 wherein the analyzing step further comprises:
    retrieving one or more identity attributes for the first user associated with the session; and
    comparing the retrieved one or more identity attributes with information returned in the results from the invoked F-SSO.

11. The apparatus as described in claim 8 wherein the anomaly workflow performs an action.

12. The apparatus as described in claim 11 wherein the action is one of: issuing a notification, sending an alert, blocking the request, quarantining the computing device, and allowing the request to continue to proceed despite the anomaly.

13. The apparatus as described in claim 8 wherein the F-SSO request is an external F-SSO request.

14. The apparatus as described in claim 8 wherein the session is a user session initiated from a client browser.

15. A computer program product in a non-transitory computer readable medium for use in a data processing system to detect that a computing device associated with a first user is unsecured, the computer program product holding computer program instructions which, when executed by the data processing system, perform a method comprising:

during a session established with the first user, receiving a request from the computing device and made by a second user, the request being a federated request to access an identity provider where the first user has an account but has not yet authenticated for the session;

following authentication of the second user at the identity provider, automatically invoking a federated single sign-on (F-SSO) to the identity provider on behalf of the second user;

receiving results from the invoked F-SSO;

analyzing information returned in the results to detect an authentication anomaly that indicates the computing device is being used by the second user during the session established with the first user and thus is unsecured; and upon detecting an authentication anomaly, initiating an anomaly workflow.

16. The computer program product as described in claim 15 wherein the analyzing step comprises:

retrieving data associated with one or more known identity provider relationships for the first user associated with the session; and comparing the retrieved with information about the second user returned in the results from the invoked F-SSO.

17. The computer program product as described in claim 16 wherein the analyzing step further comprises:

retrieving one or more identity attributes for the first user associated with the session; and comparing the retrieved one or more identity attributes with information returned in the results from the invoked F-SSO.

18. The computer program product as described in claim 15 wherein the anomaly workflow performs an action.

19. The computer program product as described in claim 18 wherein the action is one of: issuing a notification, sending an alert, blocking the request, quarantining the computing device, and allowing the request to continue to proceed despite the anomaly.

20. The computer program product as described in claim 15 wherein the F-SSO request is an external F-SSO request.

* * * * *